(12) United States Patent
Casagrande et al.

(10) Patent No.: US 9,571,888 B2
(45) Date of Patent: Feb. 14, 2017

(54) SELECTION GRAPHICS OVERLAY OF MATRIX CODE

(75) Inventors: Steven M. Casagrande, Castle Rock, CO (US); Charlie W. Zetterower, Parker, CO (US); Max S. Gratton, Lakewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 480 days.

(21) Appl. No.: 13/028,030

(22) Filed: Feb. 15, 2011

(65) Prior Publication Data

US 2012/0206648 A1 Aug. 16, 2012

(51) Int. Cl.
| | |
|---|---|
| H04N 21/234 | (2011.01) |
| H04N 21/25 | (2011.01) |
| H04N 21/258 | (2011.01) |
| H04N 21/422 | (2011.01) |
| H04N 21/431 | (2011.01) |
| H04N 21/45 | (2011.01) |
| H04N 21/81 | (2011.01) |

(52) U.S. Cl.
CPC ...... *H04N 21/4524* (2013.01); *H04N 21/8146* (2013.01)

(58) Field of Classification Search
None
See application file for complete search history.

(56) References Cited

U.S. PATENT DOCUMENTS

| | | | |
|---|---|---|---|
| 4,809,325 A | 2/1989 | Hayashi et al. | |
| 4,837,414 A | 6/1989 | Edamula | |

(Continued)

FOREIGN PATENT DOCUMENTS

| | | |
|---|---|---|
| CA | 2 634 951 A1 | 1/2010 |
| CN | 1352765 A | 6/2002 |

(Continued)

OTHER PUBLICATIONS

Extended European Search Report for EP 12152690.9 dated Jun. 19, 2012, 9 pages.

(Continued)

*Primary Examiner* — Brian T Pendleton
*Assistant Examiner* — Jean D Saint Cyr
(74) *Attorney, Agent, or Firm* — Kilpatrick Townsend & Stockton

(57) ABSTRACT

The document discloses a method for communicating information, such as audiovisual data and other information to a user. The method includes receiving a broadcast signal on a content receiver. The broadcast signal includes a video signal and a graphical signal, and the graphical signal includes a matrix barcode. After the content receiver receives the broadcast signal, the content receiver determines whether the matrix barcode should be displayed. The determination that the matrix barcode should be displayed may be based on the geographic location of the content receiver or user settings/preferences stored on the content receiver. If the matrix barcode should be displayed, the content receiver creates and outputs a modified signal. The modified signal includes the video signal with the matrix barcode overlaid on top of the video signal. If the matrix barcode should not be displayed, the content receiver outputs the broadcast signal.

17 Claims, 6 Drawing Sheets

(56) References Cited

U.S. PATENT DOCUMENTS

| | | |
|---|---|---|
| 5,500,681 A * | 3/1996 | Jones ............................ 348/473 |
| 5,510,603 A | 4/1996 | Hess et al. |
| 5,581,636 A | 12/1996 | Skinger |
| 5,602,377 A | 2/1997 | Beller et al. |
| 5,703,349 A | 12/1997 | Meyerson et al. |
| 5,929,849 A | 7/1999 | Kikinis |
| 5,959,285 A | 9/1999 | Schuessler |
| 5,963,265 A | 10/1999 | Bae et al. |
| 5,978,855 A | 11/1999 | Metz et al. |
| 6,006,990 A | 12/1999 | Ye et al. |
| 6,058,238 A | 5/2000 | Ng |
| 6,263,502 B1 | 7/2001 | Morrison et al. |
| 6,438,751 B1 | 8/2002 | Voyticky et al. |
| 6,512,919 B2 | 1/2003 | Ogasawara |
| 6,556,273 B1 | 4/2003 | Wheeler et al. |
| 6,704,929 B1 | 3/2004 | Ozer et al. |
| 6,766,956 B1 | 7/2004 | Boylan et al. |
| 6,983,304 B2 | 1/2006 | Sato |
| 7,046,161 B2 | 5/2006 | Hayes |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,224,404 B2 * | 5/2007 | An et al. ......................... 348/584 |
| 7,328,848 B2 | 2/2008 | Xia et al. |
| 7,349,668 B2 | 3/2008 | Ilan et al. |
| 7,369,180 B2 | 5/2008 | Xing |
| 7,373,652 B1 | 5/2008 | Bayrakeri et al. |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,587,601 B2 | 9/2009 | Levy et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,818,675 B2 | 10/2010 | Maruyama et al. |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,364,018 B2 | 1/2013 | McArdle |
| 8,380,993 B2 | 2/2013 | Chen et al. |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 8,511,540 B2 | 8/2013 | Anguiano |
| 8,534,540 B2 | 9/2013 | Gratton et al. |
| 8,550,334 B2 | 10/2013 | Gratton et al. |
| 8,553,146 B2 | 10/2013 | Kennedy |
| 8,746,554 B2 | 6/2014 | Gomez et al. |
| 8,786,410 B2 | 7/2014 | Beals et al. |
| 8,827,150 B2 | 9/2014 | Gratton et al. |
| 8,833,640 B2 | 9/2014 | Martch et al. |
| 8,856,853 B2 | 10/2014 | Casagrande et al. |
| 8,875,173 B2 | 10/2014 | Kilaru et al. |
| 8,886,172 B2 | 11/2014 | Gomez |
| 8,931,031 B2 | 1/2015 | Schaefer |
| 9,092,830 B2 | 7/2015 | Gomez et al. |
| 9,148,686 B2 | 9/2015 | Gerhards et al. |
| 9,280,515 B2 | 3/2016 | Gaede et al. |
| 2001/0037297 A1 | 11/2001 | McNair |
| 2001/0052133 A1 | 12/2001 | Pack et al. |
| 2002/0011521 A1 * | 1/2002 | Lahey ................... G06Q 30/02 235/487 |
| 2002/0027612 A1 | 3/2002 | Brill et al. |
| 2002/0049980 A1 | 4/2002 | Hoang |
| 2002/0065728 A1 | 5/2002 | Ogasawara |
| 2002/0112250 A1 | 8/2002 | Koplar et al. |
| 2002/0195495 A1 | 12/2002 | Melick et al. |
| 2003/0018711 A1 | 1/2003 | Imanishi |
| 2003/0050854 A1 | 3/2003 | Showghi et al. |
| 2003/0077065 A1 | 4/2003 | Scholten et al. |
| 2003/0112974 A1 | 6/2003 | Levy |
| 2003/0121978 A1 | 7/2003 | Rubin et al. |
| 2003/0125092 A1 | 7/2003 | Burnhouse et al. |
| 2003/0151562 A1 | 8/2003 | Kulas |
| 2003/0172374 A1 | 9/2003 | Vinson et al. |
| 2004/0005900 A1 | 1/2004 | Zilliacus |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2004/0046790 A1 | 3/2004 | Agarwal et al. |
| 2004/0049672 A1 | 3/2004 | Nollet et al. |
| 2004/0260850 A1 | 12/2004 | Yu et al. |
| 2005/0009564 A1 | 1/2005 | Hayaashi et al. |
| 2005/0011958 A1 | 1/2005 | Fukasawa et al. |
| 2005/0015800 A1 | 1/2005 | Holcomb |
| 2005/0015815 A1 * | 1/2005 | Shoff et al. ................... 725/135 |
| 2005/0055281 A1 | 3/2005 | Williams |
| 2005/0059339 A1 | 3/2005 | Honda et al. |
| 2005/0097618 A1 | 5/2005 | Arling et al. |
| 2005/0107135 A1 | 5/2005 | Deeds et al. |
| 2005/0125301 A1 | 6/2005 | Muni |
| 2005/0149967 A1 | 7/2005 | Hanley et al. |
| 2005/0163483 A1 | 7/2005 | Rassool |
| 2005/0180804 A1 | 8/2005 | Andrew et al. |
| 2005/0203854 A1 | 9/2005 | Das |
| 2005/0258250 A1 | 11/2005 | Melick et al. |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0065733 A1 | 3/2006 | Lee et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0090179 A1 | 4/2006 | Hsu et al. |
| 2006/0095286 A1 | 5/2006 | Kimura |
| 2006/0124742 A1 | 6/2006 | Rines et al. |
| 2006/0174317 A1 | 8/2006 | Onomatsu et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0008344 A1 | 1/2007 | Medina |
| 2007/0011709 A1 | 1/2007 | Katz et al. |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernathy et al. |
| 2007/0174198 A1 | 7/2007 | Kasahara |
| 2007/0192723 A1 | 8/2007 | Anzelde et al. |
| 2007/0200335 A1 | 8/2007 | Tuschel |
| 2007/0206020 A1 | 9/2007 | Duffield et al. |
| 2007/0256118 A1 | 11/2007 | Nomura et al. |
| 2007/0288594 A1 | 12/2007 | Philyaw et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0263621 A1 | 10/2008 | Austerlitz et al. |
| 2008/0267537 A1 | 10/2008 | Thuries |

(56) References Cited

U.S. PATENT DOCUMENTS

| | | |
|---|---|---|
| 2008/0281624 A1 | 11/2008 | Shibata |
| 2008/0288460 A1 | 11/2008 | Poniatowski et al. |
| 2008/0288600 A1* | 11/2008 | Clark ..................... 709/206 |
| 2008/0307348 A1 | 12/2008 | Jones et al. |
| 2009/0029725 A1 | 1/2009 | Kindberg |
| 2009/0031071 A1 | 1/2009 | Chiu |
| 2009/0031373 A1 | 1/2009 | Hogyoku |
| 2009/0070699 A1 | 3/2009 | Birkill et al. |
| 2009/0083808 A1 | 3/2009 | Morrison |
| 2009/0088213 A1 | 4/2009 | Rofougaran |
| 2009/0094546 A1 | 4/2009 | Anzelde et al. |
| 2009/0108057 A1 | 4/2009 | Mu et al. |
| 2009/0113334 A1 | 4/2009 | Chakra et al. |
| 2009/0116074 A1 | 5/2009 | Wilsher |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0196456 A1 | 8/2009 | Bisti et al. |
| 2009/0200367 A1 | 8/2009 | Arnouse |
| 2009/0212112 A1 | 8/2009 | Li |
| 2009/0212113 A1 | 8/2009 | Chiu et al. |
| 2009/0234570 A1 | 9/2009 | Sever |
| 2009/0254954 A1 | 10/2009 | Jeong |
| 2009/0293088 A1 | 11/2009 | Mukerji et al. |
| 2009/0293110 A1 | 11/2009 | Koga |
| 2009/0294538 A1 | 12/2009 | Wihlborg et al. |
| 2009/0300673 A1 | 12/2009 | Bachet et al. |
| 2009/0303036 A1 | 12/2009 | Sahuguet |
| 2009/0307232 A1 | 12/2009 | Hall |
| 2009/0307719 A1 | 12/2009 | Clark et al. |
| 2009/0312105 A1 | 12/2009 | Koplar |
| 2009/0320066 A1* | 12/2009 | Soldan ............... H04N 5/765<br>725/37 |
| 2010/0001072 A1* | 1/2010 | Onogi ............... G06K 7/1095<br>235/454 |
| 2010/0017457 A1 | 1/2010 | Jumpertz et al. |
| 2010/0020970 A1 | 1/2010 | Liu et al. |
| 2010/0026721 A1 | 2/2010 | Park et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131373 A1 | 5/2010 | Kubasov |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0138344 A1 | 6/2010 | Wong |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0169935 A1 | 7/2010 | Abbruzzese |
| 2010/0188514 A1 | 7/2010 | Sato et al. |
| 2010/0201894 A1 | 8/2010 | Nakayama et al. |
| 2010/0205628 A1 | 8/2010 | Davis et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0272420 A1 | 10/2010 | Soohoo et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1* | 1/2011 | Herzig ..................... 235/375 |
| 2011/0007630 A1 | 1/2011 | Almhana et al. |
| 2011/0030068 A1 | 2/2011 | Imai |
| 2011/0039573 A1 | 2/2011 | Hardie |
| 2011/0058516 A1 | 3/2011 | Small et al. |
| 2011/0061003 A1* | 3/2011 | Miyazawa et al. .......... 715/746 |
| 2011/0065451 A1 | 3/2011 | Danado et al. |
| 2011/0087539 A1 | 4/2011 | Rubinstein et al. |
| 2011/0107374 A1 | 5/2011 | Roberts et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1* | 10/2011 | Santangelo ............ G06Q 30/02<br>705/14.64 |
| 2011/0282727 A1 | 11/2011 | Phan et al. |
| 2011/0296046 A1 | 12/2011 | Arya et al. |
| 2011/0314485 A1 | 12/2011 | Abed |
| 2011/0321114 A1 | 12/2011 | Newell |
| 2012/0075529 A1 | 3/2012 | Wong et al. |
| 2012/0084206 A1 | 4/2012 | Mehew et al. |
| 2012/0096499 A1 | 4/2012 | Dasher et al. |
| 2012/0117232 A1 | 5/2012 | Brown et al. |
| 2012/0127110 A1 | 5/2012 | Amm et al. |
| 2012/0128267 A1 | 5/2012 | Dugan et al. |
| 2012/0130835 A1 | 5/2012 | Fan et al. |
| 2012/0130851 A1 | 5/2012 | Minnick et al. |
| 2012/0131416 A1 | 5/2012 | Dugan et al. |
| 2012/0137318 A1 | 5/2012 | Kilaru et al. |
| 2012/0138671 A1 | 6/2012 | Gaede et al. |
| 2012/0139826 A1 | 6/2012 | Beals et al. |
| 2012/0139835 A1 | 6/2012 | Morrison et al. |
| 2012/0142322 A1 | 6/2012 | Gomez |
| 2012/0151293 A1 | 6/2012 | Beals |
| 2012/0151524 A1 | 6/2012 | Kilaru et al. |
| 2012/0153015 A1 | 6/2012 | Gomez et al. |
| 2012/0153017 A1 | 6/2012 | Bracalente et al. |
| 2012/0155838 A1* | 6/2012 | Gerhards et al. ........... 386/291 |
| 2012/0158919 A1 | 6/2012 | Aggarwal et al. |
| 2012/0159563 A1 | 6/2012 | Gomez et al. |
| 2012/0168493 A1 | 7/2012 | Worms |
| 2012/0168510 A1 | 7/2012 | Gratton |
| 2012/0169928 A1* | 7/2012 | Casagrande et al. ........ 348/461 |
| 2012/0175416 A1 | 7/2012 | Gomez et al. |
| 2012/0181329 A1 | 7/2012 | Gratton et al. |
| 2012/0182320 A1 | 7/2012 | Beals et al. |
| 2012/0188112 A1 | 7/2012 | Beals et al. |
| 2012/0188442 A1 | 7/2012 | Kennedy |
| 2012/0198572 A1 | 8/2012 | Beals et al. |
| 2012/0199643 A1 | 8/2012 | Minnick et al. |
| 2012/0215830 A1 | 8/2012 | Anguiano |
| 2012/0217292 A1 | 8/2012 | Gratton et al. |
| 2012/0217293 A1 | 8/2012 | Martch et al. |
| 2012/0218470 A1 | 8/2012 | Schaefer |
| 2012/0218471 A1 | 8/2012 | Gratton |
| 2012/0222055 A1 | 8/2012 | Schaefer et al. |
| 2012/0222071 A1 | 8/2012 | Gaede et al. |
| 2012/0222081 A1 | 8/2012 | Schaefer et al. |
| 2012/0293327 A1 | 11/2012 | Mountain |
| 2012/0311623 A1 | 12/2012 | Davis et al. |
| 2013/0068838 A1 | 3/2013 | Gomez et al. |
| 2013/0239157 A1 | 9/2013 | Gaede et al. |
| 2014/0046661 A1 | 2/2014 | Bruner |
| 2014/0076963 A1 | 3/2014 | Gratton et al. |
| 2014/0158762 A1 | 6/2014 | Gomez et al. |
| 2016/0066050 A1 | 3/2016 | Gerhards et al. |

FOREIGN PATENT DOCUMENTS

| | | |
|---|---|---|
| CN | 1571503 A | 1/2005 |
| CN | 1636371 A | 7/2005 |
| CN | 1675930 A | 9/2005 |
| CN | 1839398 A | 9/2006 |
| CN | 101 227 581 A | 7/2008 |
| CN | 101253504 A | 8/2008 |
| CN | 101 355 685 A | 1/2009 |

(56) References Cited

FOREIGN PATENT DOCUMENTS

| | | |
|---|---|---|
| CN | 101 409 027 A | 4/2009 |
| CN | 101 873 467 A | 10/2010 |
| CN | 101 894 113 A | 11/2010 |
| CN | 101 895 722 A | 11/2010 |
| DE | 10 2007 038 810 A1 | 2/2009 |
| EP | 1 021 035 A1 | 7/2000 |
| EP | 1 383 071 A2 | 1/2004 |
| EP | 1 555 808 A1 | 7/2005 |
| EP | 1 724 695 A1 | 11/2006 |
| EP | 1 757 222 A1 | 2/2007 |
| EP | 1 768 400 A2 | 3/2007 |
| EP | 2 079 051 A1 | 7/2009 |
| EP | 2 131 289 A1 | 12/2009 |
| EP | 2 439 936 A2 | 4/2012 |
| FR | 2 565 748 A1 | 12/1985 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| JP | 2002-215768 A | 8/2002 |
| JP | 2007-213548 A | 8/2007 |
| JP | 2008 244556 A | 10/2008 |
| JP | 2009-140204 A | 6/2009 |
| KR | 2004 0087776 A | 10/2004 |
| TW | 299433 | 3/1997 |
| TW | 200915193 A1 | 4/2009 |
| TW | 200926075 A | 6/2009 |
| TW | 201032139 A | 1/2010 |
| TW | 201038061 | 10/2010 |
| TW | 201043039 A1 | 12/2010 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2005/109338 A1 | 11/2005 |
| WO | 2007/009005 A1 | 1/2007 |
| WO | 2009/056897 A1 | 5/2009 |
| WO | 2009/057651 | 5/2009 |
| WO | 2009/116954 A2 | 9/2009 |
| WO | 2009/144536 A1 | 12/2009 |
| WO | 2010/149161 A1 | 12/2010 |
| WO | 2011/009055 A2 | 1/2011 |

OTHER PUBLICATIONS

International Search Report and Written Opinion of PCT/US2012/026624 mailed Aug. 29, 2012, 14 pages.
U.S. Appl. No. 12/958,073, filed Dec. 1, 2010, Office Action mailed Aug. 31, 2012, 12 pages.
U.S. Appl. No. 12/961,369, filed Dec. 6, 2010, Final Rejection mailed Oct. 30, 2012, 17 pages.
U.S. Appl. No. 12/971,349, filed Dec. 7, 2010, Final Rejection mailed Oct. 24, 2012, 11 pages.
U.S. Appl. No. 12/953,227, filed Nov. 23, 2010, Office Action mailed Nov. 7, 2012, 31 pages.
U.S. Appl. No. 13/015,382, filed Jan. 27, 2011, Office Action Mailed Nov. 13, 2012, 7 pages.
U.S. Appl. No. 13/016,483, filed Jan. 28, 2011 Office Action mailed Nov. 2, 2012, 18 pages.
U.S. Appl. No. 12/953,273, filed Nov. 23, 2010, Notice of Allowance, mailed Oct. 18, 2012, 11 pages.
U.S. Appl. No. 13/034,482, filed Feb. 24, 2011, Office Action mailed Oct. 19, 2012, 11 pages.
U.S. Appl. No. 13/035,474, filed Feb. 25, 2011, Office Action mailed Oct. 30, 2012, 11 pages.
U.S. Appl. No. 12/960,285, filed Dec. 3, 2010, Final Office Action mailed Dec. 6, 2012, 17 pages.
U.S. Appl. No. 13/037,312, filed Feb. 28, 2011, Office Action mailed Aug. 15, 2012, 9 pages.
"Android App Reviews & Showcase Just a Tapp Away," Android Tapp, 10 pp. Found online at http://www.androidtapp.com/download-the-weather-channel-android-app-from-your-tv/, Oct. 22, 2010.
"Can Mobile Barcodes Work on TV?," India and Asia Pacific Mobile Industry Reports, Sep. 2009, 4 pp. Found online at http://www.gomonews.com/can-mobile-barcodes-work-on-tv/, Oct. 22, 2010.
"Fox TV Uses QR Codes," 2d Barcode Strategy, Sep. 2010, 6 pp. Found online at http://www.2dbarcodestrategy.com/2010/09/fox-tv-uses-qr-codes.html, Oct. 22, 2010.
"Fox's Fringe Uses QR Code," 2d Barcode Strategy, Oct. 2010, 4 pp. Found on the Internet at http://www.2dbarcodestrategy.com/2010/10/foxs-fringe-uses-qr-code.html, Oct. 22, 2010.
"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.
"What Can I Do with the QR Barcode," Search Magnet Local-QR Barcode Technology, 2 pp. Found online at http://www.searchmagnetlocal.com/qr_barcode_technology.html, Oct. 22, 2010.
Kartina Costedio, "Bluefly QR Codes Debut on TV," 2 pp. Found online at http://www.barcode.com/Mobile-Barcode-News/bluefly-qr-codes-debut-on-tv.html, Oct. 22, 2010.
Gao, J. et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . ., Oct. 22, 2010.
Smith, Lindsay, "Barcodes Make History on Global TV", 3 pp. Found online at http://www.lindsaysmith.com/worlds-first-mobio-mini-telethon/, Oct. 22, 2010.
Nghee, Seah Y., "Data Transmission Between PDA and PC Using WIFI for Pocket Barcode Application", Thesis, University Teknologi Malaysia, May 2007, 126 pp. Found online at http://eprints.utm.my/6421/1/SeahYeowNgeeMFKE20007TTT.pdf, Oct. 22, 2010.
Olson, Elizabeth, "Bar Codes Add Detail on Items in TV Ads," New York Times, Sep. 2010, 3 pp. Found online at http:www.nytimes.com/2010/09/27/business/media/27bluefly.html?src=busln, Oct. 22, 2010.
Rekimoto, Jun et al., "Augment-able Reality: Situated Communication Through Physical and Digital Spaces", Sony Computer Science Laboratory, 2002, 8 pp. Found online at Citeseer: 10.1.1.20.34[1].pdf, Oct. 22, 2010.
Silverstein, Barry, "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Yamanari, Tomofumi et al., "Electronic Invisible Code Display Unit for Group Work on Reminiscence Therapy," Proceedings of the International MultiConference of Engineers and Computer Scientists 2009, vol. I, IMECS 2009, Mar. 2009, 6 pp. Retrieved from Internet: http://citeseerx.ist.psu.edu/viewdoc/download?doi=10.1.1.148.6904&rep1&type=pdf.
International Search Report and Written Opinion of PCT/US11/59977 mailed on Mar. 19, 2012, 7 pages.
International Search Report and Written Opinion of PCT/US11/60002 mailed on Feb. 15, 2012, 7 pages.
International Search Report and Written Opinion of PCT/US11/60104 mailed on Mar. 29, 2012, 9 pages.
International Search Report and Written Opinion of PCT/US11/60121 mailed on Feb. 14, 2012, 7 pages.
International Search Report and Written Opinion of PCT/US11/61074 mailed on Jan. 6, 2012, 11 pages.
International Search Report and Written Opinion of PCT/US11/61211 mailed on Mar. 29, 2012, 8 pages.
International Search Report and Written Opinion of PCT/US11/61773 mailed on Feb. 21, 2012, 7 pages.
International Search Report and Written Opinion of PCT/US11/61778 mailed on Mar. 2, 2012, 7 pages.

(56) References Cited

OTHER PUBLICATIONS

International Search Report and Written Opinion of PCT/US11/63111 mailed on Apr. 4, 2012, 9 pages.
International Search Report and Written Opinion of PCT/US11/64709 mailed on Apr. 10, 2012, 8 pages.
International Search Report and Written Opinion of PCT/US2011/060098 mailed on Mar. 29, 2012, 10 pages.
International Search Report and Written Opinion of PCT/US2011/063308 mailed on Mar. 29, 2012, 10 pages.
International Search Report and Written Opinion of PCT/US2011/068176 mailed on Mar. 29, 2012, 15 pages.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
U.S. Appl. No. 12/961,369, filed Dec. 6, 2010, Office Action mailed Mar. 9, 2012, 17 pages.
U.S. Appl. No. 12/971,349, filed Dec. 17, 2010, Office Action mailed Nov. 10, 2011, 9 pages.
U.S. Appl. No. 12/971,349, filed Dec. 17, 2010, Final Office Action mailed Jan. 20, 2012, 10 pages.
U.S. Appl. No. 12/986,721, filed Jan. 7, 2011, Office Action mailed Mar. 16, 2012, 6 pages.
Byford, D., "Universal Interactive Device," International Business Machines Corporation, Jun. 1998, 1 page.
International Search Report and Written Opinion of PCT/US11/60094 mailed on Mar. 30, 2012, 7 pages.
International Search Report of PCT/US11/60109 mailed on Feb. 14, 2012, 3 pages.
International Search Report and Written Opinion of PCT/US2011/068161 mailed on Jun. 14, 2012, 19 pages.
International Search Report and Written Opinion of PCT/US2012/021657 mailed on May 23, 2012, 12 pages.
International Search Report and Written Opinion of PCT/US2012/022405 mailed on Apr. 19, 2012, 11 pages.
International Search Report and Written Opinion of PCT/US2012/024923 mailed on May 22, 2012, 12 pages.
International Search Report and Written Opinion of PCT/US2012/024956 mailed on Jun. 11, 2012, 10 pages.
International Search Report and Written Opinion of PCT/US2012/025502 mailed Jun. 8, 2012, 13 pages.
International Search Report and Written Opinion of PCT/US2012/025607 mailed Jun. 8, 2012, 13 pages.
International Search Report and Written Opinion of PCT/US2012/025634 mailed on May 7, 2012, 8 pages.
International Search Report and Written Opinion of PCT/US2012/026373 mailed Jun. 13, 2012, 14 pages.
International Search Report and Written Opinion of PCT/US2012/026722 mailed Jun. 28, 2012, 11 pages.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Yang, C., et al., "Embedded Digital Information Integrated by Video-on-Demand System," Proceedings of the Fourth International Conference on Networked Computing and Advanced Information Management, IEEE Computer Society, 2008, 6 pages.
U.S. Appl. No. 12/971,349, filed Dec. 17, 2010, Office Action mailed Jul. 16, 2012, 11 pages.
U.S. Appl. No. 12/984,385, filed Jan. 4, 2011, Office Action mailed Jul. 12, 2012, 16 pages.
U.S. Appl. No. 12/986,721, filed Jan. 7, 2011, Notice of Allowance mailed Jun. 21, 2012, 7 pages.
U.S. Appl. No. 13/020,678, filed Feb. 3, 2011, Office Action mailed Jul. 30, 2012, 15 pages.
U.S. Appl. No. 13/035,525, filed Feb. 25, 2011, Office Action mailed Jul. 18, 2012, 15 pages.
International Search Report of PCT/US2012/022581 mailed on Oct. 8, 2012, 18 pages.

International Search Report and Written Opinion of PCT/US2012/048032, mailed Oct. 16, 2012, 14 pages.
O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.
U.S. Appl. No. 12/958,073, filed Dec. 1, 2010, Notice of Allowance mailed Jan. 17, 2013, 17 pages.
U.S. Appl. No. 12/981,244, filed Dec. 29, 2010, Office Action mailed Dec. 21, 2012, 23 pages.
U.S. Appl. No. 12/984,385, filed Jan. 4, 2011, Notice of Allowance mailed Nov. 28, 2012, 11 pages.
U.S. Appl. No. 13/015,382, filed Jan. 27, 2011, Notice of Allowance mailed Feb. 22, 2013, 12 pages.
U.S. Appl. No. 13/007,317, filed Jan. 14, 2011, Office action mailed Dec. 19, 2012, 29 pages.
U.S. Appl. No. 13/020,678, filed Feb. 3, 2011, Notice of Allowance mailed Jan. 3, 2013, 13 pages.
U.S. Appl. No. 13/035,525, filed Feb. 25, 2011, Final Office Action mailed Jan. 31, 2013, 26 pages.
U.S. Appl. No. 13/037,302, filed Feb. 28, 2011 Office Action mailed Mar. 1, 2013, 20 pages.
U.S. Appl. No. 13/037,312, filed Feb. 28, 2011, Final Office Action mailed Feb. 28, 2013, 18 pages.
U.S. Appl. No. 13/037,316, filed Feb. 28, 2011, Office Action mailed Jan. 30, 2013, 21 pages.
U.S. Appl. No. 13/037,333, filed Feb. 28, 2011 Notice of Allowance mailed Jan. 18, 2013, 27 pages.
U.S. Appl. No. 13/673,480, filed Nov. 9, 2012 Office Action mailed Jan. 16, 2013, 27 pages.
U.S. Appl. No. 12/953,227, filed Nov. 23, 2010, Final Office Action mailed May 24, 2013, 17 pages.
U.S. Appl. No. 12/973,431, filed Dec. 20, 2010, Non-Final Rejection mailed May 15, 2013, 30 pages.
U.S. Appl. No. 13/014,591, Notice of Allowance mailed May 24, 2013, 32 pages.
U.S. Appl. No. 13/007,317, Notice of Allowance mailed May 13, 2013, 16 pages.
U.S. Appl. No. 13/031,115, Notice of Allowance mailed Apr. 16, 2013, 24 pages.
U.S. Appl. No. 13/034,482, filed Feb. 24, 2011, Final Office Action mailed Apr. 25, 2013, 19 pages.
U.S. Appl. No. 13/035,474, filed Feb. 25, 2011, Final Rejection mailed Mar. 29, 2013, 20 pages.
U.S. Appl. No. 12/960,285, filed Dec. 3, 2010, Final Office Action mailed Apr. 18, 2013, 14 pages.
U.S. Appl. No. 13/035,525, filed Feb. 25, 2011, Non-Final Office Action mailed May 15, 2013, 15 pages.
U.S. Appl. No. 12/961,369, filed Dec. 6, 2010, Non-Final Office Action mailed Feb. 13, 2014, 21 pages.
U.S. Appl. No. 13/010,557, filed Jan. 20, 2011, Final Rejection mailed Jan. 16, 2014, 17 pages.
U.S. Appl. No. 13/010,557, filed Jan. 20, 2011, Non-Final Rejection mailed Aug. 5, 2013, 17 pages.
U.S. Appl. No. 13/192,287, filed Jul. 27, 2011, Final Office Action mailed Jan. 28, 2014, 18 pages.
U.S. Appl. No. 13/035,474, filed Feb. 25, 2011, Non Final Rejection mailed Mar. 6, 2014, 20 pages.
U.S. Appl. No. 12/965,645, filed Dec. 10, 2010, Final Office Action, mailed Mar. 18, 2014, 24 pages.
U.S. Appl. No. 13/037,312, filed Feb. 28, 2011, Notice of Allowance mailed Jun. 13, 2013, 10 pages.
U.S. Appl. No. 13/968,611, filed Aug. 16, 2013, Non-Final Office Action mailed Jan. 17, 2014, 21 pages.
Jung, Eui-Hyun et al., "A Robust Digital Watermarking System Adopting 2D Barcode against Digital Piracy on P2P Network," IJCSNS International Journal of Computer Science and Network Security, vol. 6, No. 10, Oct. 2006, 6 pages.
First Office Action by the Mexican Institute of Industrial Property for Mexican Patent Application No. MX/a/2013/00988 dated Aug. 14, 2014, 3 pages.
International Preliminary Report on Patentability for PCT/US2011/060002 mailed Jun. 6, 2013, 6 pages.

(56) References Cited

OTHER PUBLICATIONS

International Preliminary Report on Patentability for PCT/US2011/060094 mailed Jun. 20, 2013, 6 pages.
International Preliminary Report on Patentability for PCT/US2011/060121 mailed Jun. 20, 2013, 6 pages.
International Preliminary Report on Patentability for PCT/US2011/061211 mailed Jul. 4, 2013, 7 pages.
International Preliminary Report on Patentability for PCT/US2011/061773 mailed Jun. 6, 2013, 6 pages.
International Preliminary Report on Patentability for PCT/US2011/061778 mailed Jul. 11, 2013, 6 pages.
International Preliminary Report on Patentability for PCT/US2011/060098 mailed Jun. 13, 2013, 9 pages.
International Preliminary Report on Patentability for PCT/US2011/063308 mailed Jul. 18, 2013, 9 pages.
International Preliminary Report on Patentability for PCT/US2012/022581 mailed Aug. 8, 2013, 12 pages.
International Preliminary Report on Patentability for PCT/US2012/022405 mailed Aug. 8, 2013, 7 pages.
International Preliminary Report on Patentability for PCT/US2012/024923 mailed Aug. 29, 2013, 8 pages.
International Preliminary Report on Patentability for PCT/US2012/024956 mailed Aug. 29, 2013, 7 pages.
International Preliminary Report on Patentability for PCT/US2012/025607 mailed Sep. 12, 2013, 8 pages.
International Preliminary Report on Patentability for PCT/US2012/025634 mailed Sep. 6, 2013, 5 pages.
International Preliminary Report on Patentability for PCT/US2012/026373 mailed Sep. 12, 2013, 10 pages.
International Preliminary Report on Patentability for PCT/US2012/026624 mailed Sep. 12, 2013, 12 pages.
International Preliminary Report on Patentability for PCT/US2011/060109 mailed Jun. 20, 2013, 7 pages.
Office Action of the Intellectual Property Office for ROC Patent App. No. 101101486, dated Aug. 5, 2014, 4 pages.
The First Office Action for Mexican Patent Application No. MX/a/2013/006262 is not translated into English. This document is from prosecution of the corresponding foreign matter for which we do not have a translation. Dated Aug. 7, 2014, 2 pages.
Publication of PCT/US2011/059977 by the India Controller General of Patents Designs and Trademarks as India Patent Publication No. 4694/CHENP/2013 A on Sep. 5, 2014, 1 page.
Publication of PCT/US2012/025634 by the India General Patents Designs and Trademarks as India Patent Publication No. 6967/CHENP/2013 A on Aug. 1, 2014, 1 page.
U.S. Appl. No. 13/034,482, filed Feb. 24, 2011 Notice of Allowance mailed Aug. 29, 2014, 45 pages.
U.S. Appl. No. 13/035,474, filed Feb. 25, 2011 Final Rejection mailed Aug. 27, 2014, 38 pages.
U.S. Appl. No. 13/006,270, filed Jan. 13, 2011 Non-Final Office Action mailed Sep. 12, 2014, 41 pages.
Extended European Search Report for EP 11842890.3 dated Mar. 26, 2014, 8 pages.
Extended European Search Report for EP 11850819.1 dated Mar. 17, 2014, 5 pages.
Extended European Search Report for EP 11846486 dated Mar. 26, 2014, 5 pages.
Extended European Search Report for EP 11852630 dated Jun. 30, 2014, 7 pages.
International Preliminary Report on Patentability of PCT/US2012/048032 mailed on Apr. 3, 2014, 6 pages.
International Preliminary Report on Patentability of PCT/US2011/063111 mailed Jun. 13, 2013, 8 pages.
Kato et al, "2D barcodes for mobile phones", Mobile Technology, Applications and Systems, 2005 2nd International Conference on Guangzhou, China Nov. 15-17, 2005, Piscataway, NJ, USA, IEEE, Piscataway, NJ, USA, Nov. 15, 2005, pp. 8pp-8, XP031887368, DOI: 10.1109/MTAS.2005.207166; ISBN: 978-981-05-4573-4, 8 pages.

Office Action and Search Report for ROC (Taiwan) Patent Application No. 10014870 dated May 7, 2014, issued in the corresponding foreign application, 9 pages.
Office Action and Search Report for ROC (Taiwan) Patent Application No. 100142966 dated May 27, 2014, 6 pages.
Office Action for European Patent Application No. 12719817.4 dated Jun. 23, 2014 issued in the corresponding foreign application, 5 pages.
U.S. Appl. No. 14/179,336, filed Feb. 12, 2014, Non-Final Office Action mailed May 22, 2014, 14 pages.
U.S. Appl. No. 12/961,369, filed Dec. 6, 2010, Notice of Allowance mailed Jul. 16, 2014, 15 pages.
U.S. Appl. No. 12/981,244, filed Dec. 29, 2010, Notice of Allowance mailed Mar. 25, 2014, 17 pages.
U.S. Appl. No. 12/965,645, filed Dec. 10, 2010, Notice of Allowance, mailed Jun. 20, 2014, 35 pages.
U.S. Appl. No. 12/960,285, filed Dec. 3, 2010, Non-Final Office Action mailed Jun. 6, 2014, 19 pages.
U.S. Appl. No. 13/006,270, filed Jan. 13, 2011, Final Office Action mailed May 9, 2014, 41 pages.
U.S. Appl. No. 13/968,611, filed Aug. 16, 2013, Notice of Allowance mailed May 2, 2014, 40 pages.
First Examination Report from European Patent Office dated May 18, 2015 for EP 11849496.2, 7 pages.
European Office Action for EP 11842890.3 dated Mar. 13, 2015, 8 pages.
European Search Report for EP 11855065 dated Mar. 6, 2014, 6 pages.
Office Action for EP 11855065 dated Mar. 13, 2015, 6 pages.
Notice of Allowance by the Mexican Institute of Industrial Property for Mexican Patent Application No. MX/a/2013/009881 dated Jan. 12, 2015, 1 page.
First Office Action for CN 201180065044.7 issued Feb. 13, 2015 by the State Intellectual Property Office, 4 pages.
U.S. Appl. No. 12/973,431, filed Dec. 20, 2010 Notice of Allowance mailed May 28, 2015, 20 pages.
U.S. Appl. No. 12/960,285, filed Dec. 3, 2010 Non-Final Office Action mailed May 14, 2015, 21 pages.
U.S. Appl. No. 13/016,483, filed Jan. 28, 2011 Final Office Action mailed May 13, 2015, 34 pages.
U.S. Appl. No. 13/037,302, filed Feb. 28, 2011 Final Office Action mailed May 4, 2015, 54 pages.
U.S. Appl. No. 13/302,717, filed Nov. 22, 2011 Final Rejection mailed May 8, 2015, 44 pages.
U.S. Appl. No. 13/475,794, filed May 18, 2012 Final Office Action mailed Jun. 1, 2015, 45 pages.
Office Action from European Patent Office for Application No. 11852630.0 dated May 12, 2015, 7 pages.
Office Action dated Feb. 18, 2015 for Mexican Patent Application No. MX/a/2013/009794, 1 page.
Office Action dated Feb. 10, 2015 for Mexican Patent Application No. MX/a/2013/006770, 2 pages.
Office Action dated Feb. 6, 2015 for Mexican Patent Application No. MX/a/2013/006520, 2 pages.
Office Action and Search Report for ROC (Taiwan) Patent Application No. 100149344 issued Jan. 23, 2015, 8 pages.
Office Action for European Patent Application No. 12707435.9 dated Mar. 12, 2015, 6 pages.
U.S. Appl. No. 12/953,227, filed Nov. 23, 2010, Non Final Office action mailed Mar. 24, 2015, 39 pages.
U.S. Appl. No. 13/006,270, filed Jan. 13, 2011, Final Office Action mailed Mar. 23, 2014, 51 pages.
Office Action of the Intellectual Property Office for ROC Patent App. No. 100143194 dated Sep. 23, 2014, 10 pages.
Office Action of the Intellectual Property Office for ROC Patent App. No. 100142978 dated Sep. 23, 2014, 9 pages.
The First Office Action for Mexican Patent Application No. MX/a/2013/007672 is not translated into English. This document is from prosecution of the corresponding foreign matter for which we do not have a translation. Dated Sep. 11, 2014, 2 pages.
The Notice of Allowance received Dec. 16, 2014 for Mexican Patent Application No. MX/a/2013/009882 is not translated into English, 1 page.

(56) References Cited

OTHER PUBLICATIONS

U.S. Appl. No. 14/179,336, filed Feb. 12, 2014, Final Office Action mailed Dec. 1, 2014, 30 pages.
U.S. Appl. No. 13/475,794, filed May 18, 2012, Non-Final Office Action mailed Nov. 21, 2014, 33 pages.
U.S. Appl. No. 13/302,717, filed Nov. 22, 2011 Non-Final Rejection mailed Dec. 18, 2014, 71 pages.
U.S. Appl. No. 13/016,483, filed Jan. 28, 2011, Non-Final Office Action mailed Nov. 3, 2014, 33 pages.
U.S. Appl. No. 12/973,431, filed Dec. 20, 2010, Non-Final Rejection mailed Dec. 19, 2014, 30 pages.
U.S. Appl. No. 12/960,285, filed Dec. 3, 2010, Final Office Action mailed Dec. 3, 2014, 19 pages.
First Examination Report from European Patent Office dated Feb. 4, 2015 for EP 12716751.8, 4 pages.
Office Action dated Nov. 12, 2014 for Mexican Patent Application No. MX/a/2013/009794 is not translated into English, 2 pages.
Office Action dated Jan. 28, 2015 for Mexican Patent Application No. MX/a/2013/006973 is not translated into English, 3 pages.
Office Action from European Patent Office for Application No. 12716728.6 dated Feb. 26, 2015, 4 pages.
European Search Report for EP 11844504 dated Feb. 24, 2015, 10 pages.
U.S. Appl. No. 14/179,336, filed Feb. 12, 2014 Notice of Allowance mailed Feb. 18, 2015, 15 pages.
U.S. Appl. No. 13/035,474, filed Feb. 25, 2011 Non Final Rejection mailed Feb. 17, 2015, 57 pages.
European Office Action for EP 11842890.3 dated May 9, 2016, all pages.
First Office Action including Search Report from the State Intellectual Property Office for CN Patent Appln. No. 201280014034.5 issued on Apr. 5, 2016, all pages.
Office Action for European Patent App. 12704473.3 mailed Apr. 29, 2016, all pages.
Supplementary European Search Report for EP 11843423 completed Mar. 23, 2016, 8 pages.
Supplementary European Search Report for EP 11843045 completed Mar. 31, 2016, all pages.
Office Action and Search Report for ROC (Taiwan) Pat. Appln. No. 101106313 received May 12, 2016, all pages.
Notice of Decision to Grant for CN 201280010873 on Mar. 25, 2016, all pages.
Second Office Action for CN 201180065044.7 issued Sep. 9, 2015 by the State Intellectual Property Office (SIPO), 23 pages.
The Second Office Action dated Jun. 1, 2015 for Mexican Patent Application No. MX/a/2013/007672 is not translated into English, 2 pages.
The Second Office Action dated Apr. 22, 2015 for Mexican Patent Application No. MX/a/2013/009883, 2 pages.
U.S. Appl. No. 12/953,227, filed Nov. 23, 2010, Final Office Action mailed Nov. 6, 2015, 26 pages.
U.S. Appl. No. 12/960,285, filed Dec. 3, 2010, Notice of Allowance mailed Nov. 18, 2015, 31 pages.
Notice of Allowance and search report for ROC (Taiwan) Patent Application No. 101106288 received May 29, 2015, 9 pages.
Office Action from State Intellectual Property Office for CN Appln. No. 201180056242.7 received Jun. 17, 2015, 10 pages.
Office Action and Search Report from the State Intellectual Property Office for CN Pat. Appln. No. 201180066584.7 issued on Jul. 10, 2015, 12 pages.
The First Office Action dated Jul. 13, 2015 for Mexican Patent Application No. MX/a/2013/009791 is not translated into English, 2 pages.
U.S. Appl. No. 13/035,474, filed Feb. 25, 2011 Non Final Rejection mailed Sep. 11, 2015, 65 pages.
U.S. Appl. No. 13/864,474, filed Apr. 17, 2013 Non Final Office Action mailed Aug. 11, 2015, 59 pages.
U.S. Appl. No. 13/864,474, filed Apr. 17, 2013 Non Final Office Action mailed Mar. 23, 2016, all pages.
Second Office Action from State Intellectual Property Office for CN Appln. No. 201180056242.7 issued Jan. 26, 2016, all pages.
First Office Action and Search Report from the State Intellectual Property Office (SIPO) for CN 201180056249.9 issued on Feb. 3, 2016, all pages.
First Office Action for CN 201280010873 issued Mar. 2, 2016, all pages.
Third Office Action from State Intellectual Property Office for CN Appln. No. 201180056242.7 issued Jul. 28, 2016, all pages.
U.S. Appl. No. 13/302,717, filed Nov. 22, 2011 Non Final Rejection mailed Jun. 16, 2016, all pages.
U.S. Appl. No. 13/016,483, filed Jan. 28, 2011 Final Office Action mailed Jul. 5, 2016, all pages.
U.S. Appl. No. 13/037,302, filed Feb. 28, 2011, Final Office Action mailed Jul. 12, 2016, all pages.
U.S. Appl. No. 13/475,794, filed May 18, 2012 Non Final Office Action mailed Jul. 29, 2016, all pages.
Examination Search Report from the European Patent Office dated Dec. 4, 2015 for EP 12707418.5, 8 pages.
European Office Action for EP 12716751.8 mailed Nov. 11, 2015, 4 pages.
Office Action for EP 11850819.1 dated Nov. 12, 2015, 4 pages.
First Office Action with Search Report for CN 201280013891.3 issued Jan. 15, 2016, 13 pages.
First Office Action and Search Report from State Intellectual Property Office for CN Appln. No. 201180064527.5 issued Oct. 23, 2015, 10 pages.
Notice of Allowance mailed Nov. 10, 2015 for Mexican Patent Application No. MX/a/2013/007672, 1 page.
Notice of Allowance for Mexican Patent Application No. MX/a/2013/006973 dated Sep. 4, 2015, 1 page.
Second Office Action issued by State Intellectual Property Office for CN Pat. Appln. No. 201180066584.7 issued on Jan. 11, 2016, 5 pages.
Search Report for Patent Application ROC (Taiwan) Patent Application No. 100149344 mailed Oct. 28, 2015, 1 page.
U.S. Appl. No. 13/302,717, filed Nov. 22, 2011 Non Final Rejection mailed Dec. 2, 2015, 27 pages.
U.S. Appl. No. 13/016,483, filed Jan. 28, 2011 Non-Final Office Action mailed Dec. 14, 2015, 27 pages.
U.S. Appl. No. 13/037,302, filed Feb. 28, 2011, Non-Final Office Action mailed Jan. 12, 2016, 62 pages.
U.S. Appl. No. 13/192,287, filed Jul. 27, 2011, Notice of Allowance mailed Dec. 14, 2015, 14 pages.
U.S. Appl. No. 13/864,474, filed Apr. 17, 2013 Final Office Action mailed Nov. 20, 2015, all pages.
Liu, Yue et al., "Recognition of QR code with mobile phones," Control and Decision Conference, 2008. CCDC 2008. Jul. 2-4, 2008, pp. 203, 206.
U.S. Appl. No. 12/964,478, filed Dec. 9, 2010, Final Office Action mailed Sep. 16, 2013, 12 pages.
U.S. Appl. No. 12/961,369, filed Dec. 6, 2010, Non-Final Office Action mailed Jul. 12, 2013, 22 pages.
U.S. Appl. No. 12/981,244, filed Dec. 29, 2010, Final Office Action mailed Oct. 30, 2013, 10 pages.
U.S. Appl. No. 13/016,483, filed Jan. 28, 2011, Final Office Action mailed Jun. 27, 2013, 13 pages.
U.S. Appl. No. 12/965,645, filed Dec. 10, 2010, Non-Final Office Action, mailed Jul. 19, 2013, 20 pages.
U.S. Appl. No. 12/973,431, filed Dec. 20, 2010, Final Office Action mailed Aug. 27, 2013, 11 pages.
U.S. Appl. No. 13/006,270, filed Jan. 13, 2011, Non-Final Office Action mailed Oct. 8, 2013, 20 pages.
U.S. Appl. No. 13/035,525, filed Feb. 25, 2011, Final Office Action mailed Sep. 12, 2013, 21 pages.
U.S. Appl. No. 13/037,302, filed Feb. 28, 2011, Final Office Action mailed Oct. 16, 2013, 28 pages.
U.S. Appl. No. 13/037,316, filed Feb. 28, 2011, Final Office Action mailed Aug. 28, 2013, 13 pages.
U.S. Appl. No. 13/192,287, filed Jul. 27, 2011, Non Final Office Action mailed Jun. 13, 2013, 22 pages.
U.S. Appl. No. 13/673,480, filed Nov. 9, 2012, Final Office Action mailed Sep. 9, 2013, 10 pages.

(56) References Cited

OTHER PUBLICATIONS

International Preliminary Report on Patentability of PCT/US2011/059977 mailed on Jun. 6, 2013, 6 pages.
International Preliminary Report on Patentability of PCT/US2011/068161 mailed on Jul. 25, 2013, 13 pages.
International Preliminary Report on Patentability of PCT/US2012/025502 mailed Sep. 6, 2013, 9 pages.
U.S. Appl. No. 12/961,369, filed Dec. 6, 2010, Non-Final Office Action mailed Mar. 25, 2013, 17 pages.
U.S. Appl. No. 12/971,349, filed Dec. 7, 2010, Notice of Allowance mailed Oct. 2, 2013, 24 pages.
U.S. Appl. No. 13/673,480, filed Nov. 9, 2012, Notice of Allowance mailed Nov. 12, 2013, 16 pages.
U.S. Appl. No. 13/475,794, filed May 18, 2012, Non-Final Office Action mailed Sep. 18, 2013, 19 pages.

\* cited by examiner

SELECTION GRAPHICS OVERLAY OF MATRIX CODE

FIELD

The present invention relates generally to audiovisual content and more specifically to overlaying a computer-readable code on audiovisual content.

BACKGROUND

Content providers provide content such as audio, video and combinations thereof to a large number of users. For example, a particular television show may be broadcast to users throughout the country. This means that often a content provider may provide content to users that may not be relevant to all users. For example, in a television commercial for a department store, the address given may not be the closest store location for a particular user.

Also, some content providers may struggle to find advertisers and/or increase the number of viewers for particular content. Similarly, advertisers may desire to increase the number of customers, orders, and the like. In this case, content providers may wish to provide incentives (such as coupons) to encourage users to watch their content. However, in many instances it may be difficult to provide incentives to a particular user without providing the incentives to a larger audience as well. Similarly, it may be difficult to determine if a particular user has actually watched a specific content or simply received the information (such as a coupon code) from another source.

In some instances, certain messages or other information may be overlaid on top of a particular content. For example, public service messages, website data (e.g., uniform resource locators "URL"), enhanced news information (e.g., storm warnings) and so on. In these instances, a portion of the video content may be blocked and/or interrupted as the message/information is overlaid on top of the content. These messages may be provided to all users or a select group of users and may be controlled by a content provider.

SUMMARY

An embodiment of the present disclosure includes a method for communicating information to a user. The method includes receiving on a content receiver, a broadcast signal. The broadcast signal may include a video signal and a graphical signal, and the graphical signal may include a matrix barcode. Then, after the matrix barcode is received, a content receiver may determine whether the matrix barcode should be displayed. If the matrix barcode should be displayed, the content receiver creates and outputs a modified signal. The modified signal includes the video signal with the matrix barcode overlaid on top of the video signal. If the matrix barcode should not be displayed, the content receiver outputs the broadcast signal.

Other embodiments may include a method for receiving and displaying content. The method may include a content receiver configured to receive a data signal and a video signal. After the content receiver receives the data signal and video signal, it may generate a matrix barcode based on the data signal. During, after or before the matrix barcode is generated the video signal may be displayed on a display device. The content receiver may then determine whether to display the matrix barcode. If the matrix barcode should be displayed, then an image corresponding to the video signal may be displayed on a display device and the matrix barcode may be displayed over a portion of the image.

Still other embodiments include a content receiver having a communication interface and a processor. The communication interface may be configured to receive a broadcast signal. The broadcast signal may include a video signal and a graphical or data signal, the graphical or data signal may further include a matrix barcode. The processor is in communication with the communication interface. The processor may be configured to output the video signal, process the graphical or data signal to determine if a matrix barcode should be displayed and overlay the matrix barcode onto a portion of the video signal, in response to a determination to output the matrix barcode.

DETAILED DESCRIPTION

Figure 1:
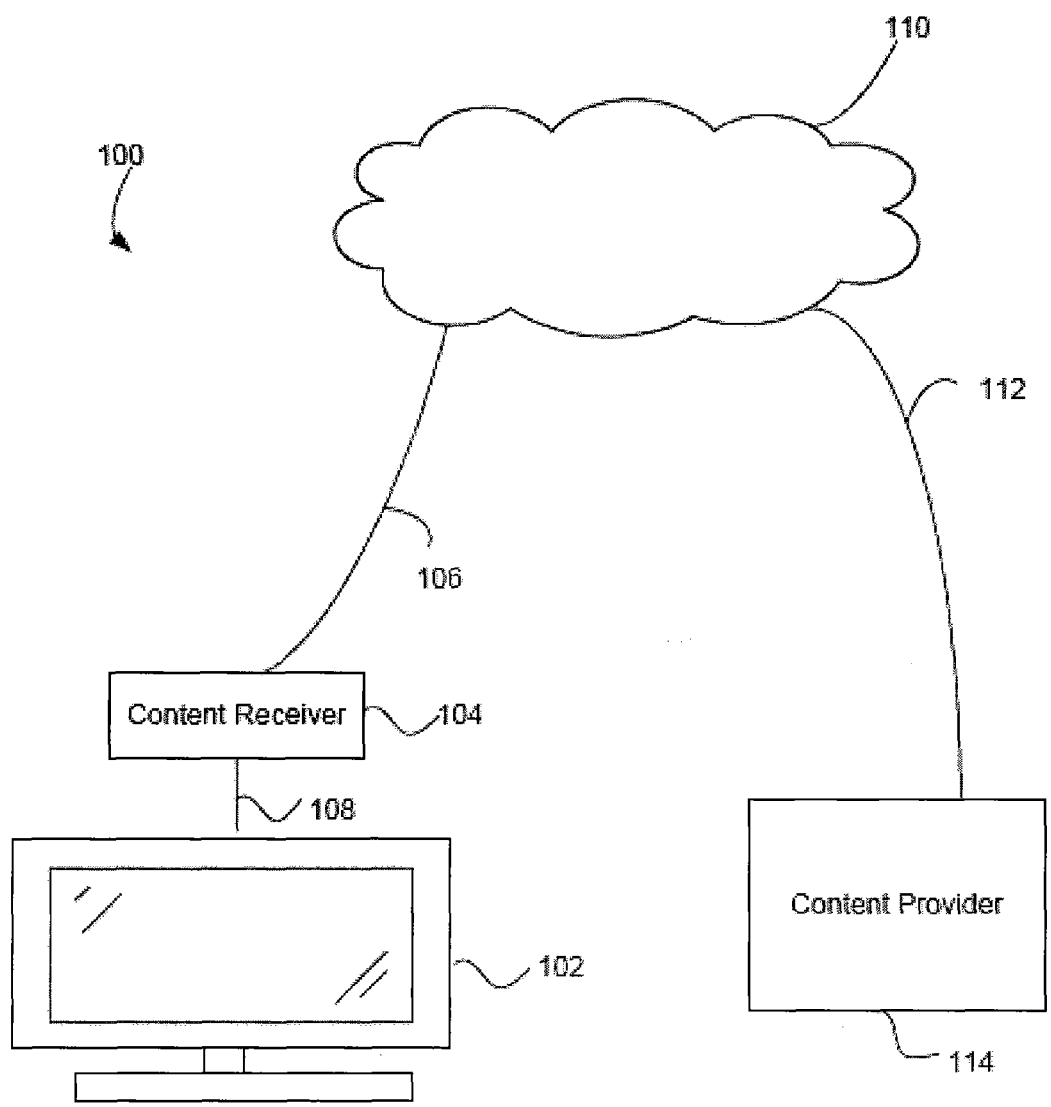
FIG. 1 is an embodiment of a content provider in communication with a content receiver and a display device.

Various examples of a system to display a matrix barcode, (such as a quick response or QR code), on a television display along with, interpreted into, or overlaid in a video content display are described herein. The matrix barcode may relay multiple types of data to a user, as well as be easily transmitted and/or transferred to other electronic devices and/or users. Further, the matrix barcode may be customizable to a select user or users and/or content receiver(s).

A content provider or source may broadcast and/or deliver one or more content or broadcast signals to a content receiver and/or a group of content receivers. The broadcast signals may include audio signals, video signals and/or subtitling signals. In one embodiment, the content signals may also include a graphical signal and/or a data signal. In some embodiments, the matrix barcode may be sent via the graphical signal; and, in other embodiments, the matrix barcode (or data for creating the matrix barcode) may be sent via a separate data channel. The audio, video, subtitling, graphical and/or data signals may be grouped together or include an identifier or marker (such as metadata) to indicate that a particular set of signals corresponds to one another and to a particular channel. For example, an audio signal and a video signal may both include a particular identifier such that correct audio may display with the correct video. Similarly, the graphical signal (including the matrix barcode) may include an identifier associating the signal with the audio and/or video signals. This may allow the matrix code to display with the corresponding audio/video display.

A content receiver may receive the broadcast signals via a communication mechanism (e.g., wireless or wired communication path). A user may then select a particular channel and/or particular content to be displayed. A selected channel may include a graphical signal carrying a matrix barcode and/or data for creating a matrix barcode. Depending on the channel selected by the user, time, location, user preferences or the like, the content receiver may display the matrix barcode on top or as part of the content to be displayed (e.g., over a video image or as the video image). The matrix barcode generally takes the form of a graphical display containing embedded data and may be used to allow the user to transmit and/or receive information. For example, the matrix barcode may be recorded by the user via an electronic device (e.g., digital camera, smart phone, tablet computer, or the like) and then presented to a store to scan as an electronic coupon. The matrix barcode may provide content providers with an ability to reward users for watching a particular program, channel and/or relay information directly to a particular user or set of users.

In some embodiments, the matrix barcode may be customized based on the location of the content receiver, preferences or settings of the content receiver, and/or other user data or preferences. For instance, the matrix barcode may include a coupon for a store near the location of the user and/or the location of the content receiver. This is because the matrix barcode may be customized depending on the particular content receiver, while still allowing other portions of a particular channel's signal (i.e., the audio and visual signals) to remain substantially the same. For example, the audiovisual display for a selected channel may be the same for content receivers in New York and Los Angeles, but the matrix barcode displayed may be different (or have different data embedded within it). This may be possible as the graphical and/or data signals may be tied to a particular channel, as well as to a particular location. Thus, in this example, the channel for ABC in New York may include a first graphical signal or data signal, whereas the channel for ABC in Los Angeles may include a different graphical or data signal, although the audiovisual signals may be substantially the same. Additionally, the graphical and/or data signals that may be displayed may also depend on previous viewing patterns of a particular user (as determined by the content receiver), authorization for particular content and/or use preferences.

In other embodiments, the content signal may not include the graphical display of the matrix barcode, but rather data used to create the matrix barcode. The graphical and/or data signal(s) may be used by the content receiver in order to create a matrix barcode that may be customized to each content receiver. For example, the matrix barcode data may be based on information that reflects the particular user's geographic location, language preference, or other types of user selected/determined preferences. In this embodiment, the content receiver receives data carried in the content signal or broadcast signals and analyzes the data to generate a matrix barcode. Then, depending on the time, channel or the like, the content receiver may overlay the matrix barcode on top of the audio/visual content displayed on the display.

FIG. 1 illustrates a content distribution system 100. The content distribution system 100 may include a content receiver 104 in communication with both a content display device 102 and a content provider 114 or broadcast center. The content distribution system 100 distributes content (such as television programming or the like) from the content provider 114 to a content receiver 104, which may then output the broadcast signal to a display device 102. The content distribution system 100 may include a plurality of content receivers 104 and/or content providers 114, or may include a single content provider 114 for multiple content receivers 104. Additionally or alternatively, the content distribution system 100 may distribute content from the content source 114 to a specific addressable content receiver 104 (e.g., "on-demand" television programming) and/or a select group of content receivers 104. For example, the broadcast signal 116 may be broadcast (i.e., sent from a content source to all content receivers 104), unicast (i.e., sent from a content source to a single content receiver 104) and/or multicast (i.e., sent from a content source to a group but not all content receivers 104).

The content provider 114 communicates via a communication path 112 to the network 110, and via the network 110 communicates through another communication path 106 to the content receiver 104. The content receiver 104 receives content from the content provider 114 (via the communication paths 106, 112) and transmits the content to the display device 102. The display device 102 then may display the content 102.

The content provider 114 selectively provides audiovisual content to one or more content receivers 104. The content provider 114 may provide content such as audio, video, images, data and the like. The content may correspond to television programming, music, pictures, and the like. In some embodiments, the content provider 114 provides content that can be selected by choosing a particular channel (e.g., audio, video, graphical signals). Thus, a combination of content signals may be output together to form a complete channel. In one embodiment, the content provider 114 may be an uplink facility that transmits the content to a satellite via the communication path 116. In this embodiment, the network 110 may include at least one satellite, a signal receiver, and a transmitter. In some embodiments, the broadcast signal may be transmitted wirelessly between the content provider 114 and the content receiver 104. In other embodiments, the content provider 114 may be a cable television distribution head-end, over-the-air transmission facility, broadband/internet servers and the like.

The content provider 114 sends the content through the communication path 112 to the network 110. The network 110 may be wireless (e.g., satellite, microwave and other radio frequencies) or wired (e.g., fiber optic wire, coaxial cable) and provides the communication paths 106, 112 between the content receiver 104 and the content provider 114. In some embodiments, the network 110 may further include satellites, receivers and/or transmitters to transmit and receive content to and from the content receiver 104 and/or the content provider 114. Similarly, the communication paths 106, 112 may be wireless or wired, or any other type of electronic communication mechanism. For example, in one embodiment, the communication paths 106, 112 are wireless and receive/transmit radio signals to and from satellites. In other embodiments, the communication paths 106, 112 are fiber optic cables. In still other embodiments, the network 110 (including the communication paths 106, 112) may include a combination of wired and wireless communications.

The display device 102 may be in electronic communication with the content receiver 104. The display device 102 may be configured to display/output the content and/or data. For example, the display device 102 may display the audio, video and data signals on a television display and/or computer monitor. The display device 102 may be any kind of electronic display such as a cathode ray tube display, a liquid crystal display, a plasma display and the like. Further, the display device 102 may also include an audio output mechanism in addition to or instead of a video display screen. For example, the display device 102 may include (either external or internal) speakers to a liquid crystal display screen, plasma display screen and the like.

The content receiver 104 receives content from the content provider 114, processes the signal and then outputs the signal(s) to the display device 102. The output signal 126 may be communicated between the content receiver 104 and the display device 102 via a communication path 108 either wirelessly or via a hardwired connection. The content receiver 104 may be practically any type of computing device able to render audiovisual content. Additionally, in some embodiments, the content receiver 104 may also be any device able to receive, transmit and/or process audio, visual and/or data signals.

Figure 2:
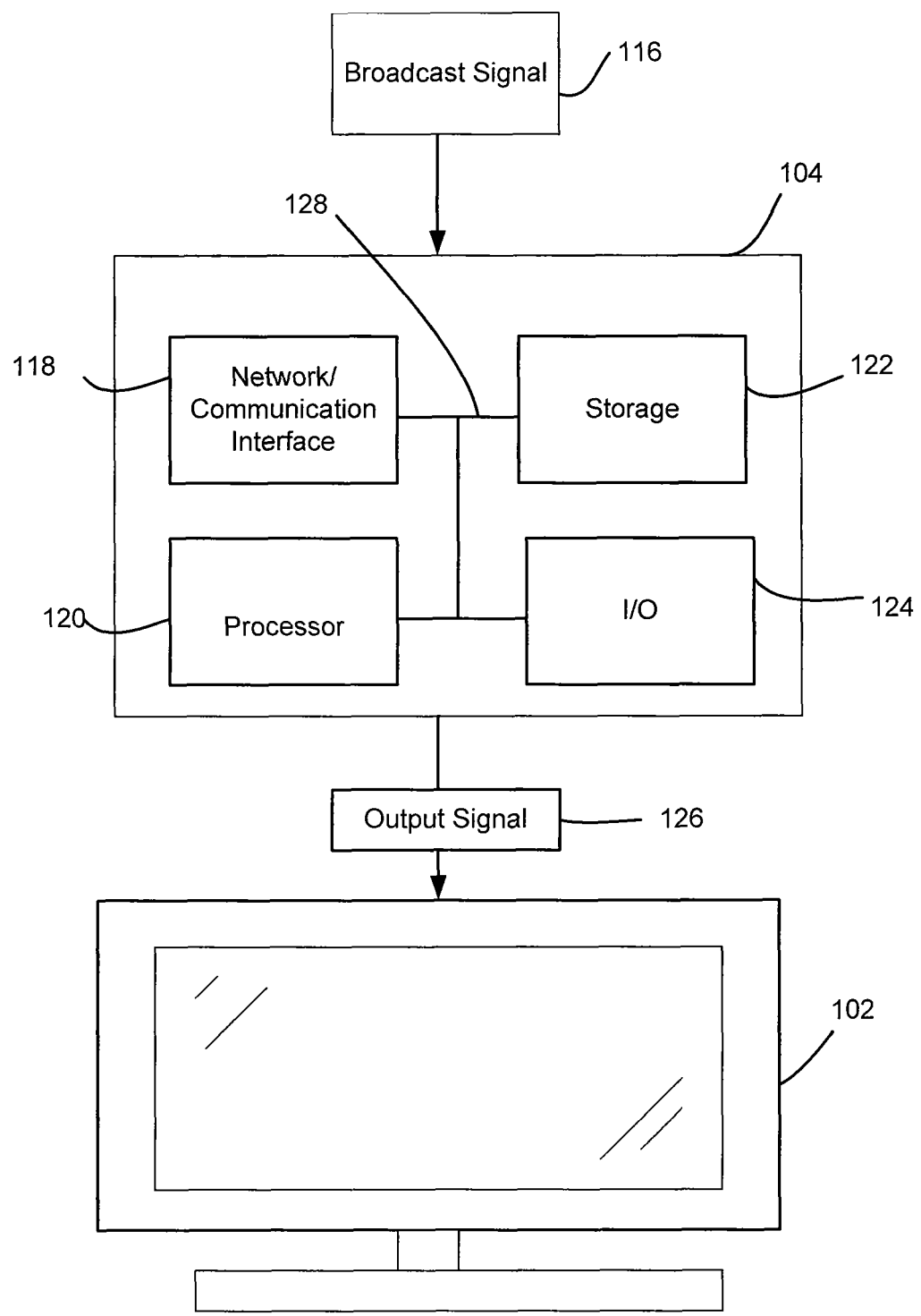
FIG. 2 is a block diagram of the content receiver receiving the broadcast signal and in communication with the display device.

FIG. 2 is a block diagram of the content receiver 104 in communication with the display device 102. Referring now to FIGS. 1 and 2, the content receiver 104 receives the content (i.e., broadcast signal) from the content provider 114. The content receiver 104 may be any type of computing device able to receive, display and/or process electronic signals either wirelessly or through a wired connection. For example, the content receiver 104 may be a set top box, a television receiver, a digital video recorder, and the like. The content source 104 may receive practically any form/type of content from almost any number of sources, this may include television programming, recoded audio/video, electronic programming guide data, subtitles, matrix barcode images, matrix barcode data and the like.

In some embodiments, the content receiver 104 may include a network/communication interface 118, storage 122, a processor 120 and an input/output interface 124. Additionally, the content receiver 104 may also include an optical drive (e.g., digital video disc player, compact disc player, high definition digital video disc player, Blu-Ray™ player, or the like), a universal serial bus drive and/or the like. Further, some or all of the components of the content receiver 104 may be in electronic communication with all or some of the other components via a system bus 128. The system bus 128 may provide a communication path to and from different components.

The network/communication interface 118 may receive a broadcast signal 116 from the content provider 116 (via the communication paths 106, 112 and/or network 110). As the network 110 may include a variety of electronic communication mediums, the network/communication interface 118 may receive an over-the-air broadcast signal, a direct broadcast satellite signal, a cable television signal, an internet protocol television signal, and/or any other type of electronic communication signals.

The storage 122 may store electronic data that may be utilized by the content receiver 104. For example, the storage 122 may store an electronic programming guide, user preference data (e.g., language, time zone and the like), settings data and the like. The storage 122 may be any type of memory that can store electronic data, such as one or more non-transitory storage media (which may take the form of, but is not limited to, a magnetic storage medium; optical storage medium; magneto-optical storage medium; read only memory; random access memory; erasable programmable memory; flash memory; and the like). The storage 122 may store identifiers associated with the location, user information, language preference and/or the like of the content receiver 104 and/or user.

The processor 120 may control operation of the content receiver 104 and may be any electronic device cable of processing, receiving and/or transmitting instructions. For example, the processor 120 may be a microprocessor, a microcomputer and the like. The processor 120 may be configured to generate content (e.g., matrix barcodes) and/or display/overlay content (e.g., matrix barcodes, subtitles, and the like) on top of the broadcast signal 116 and/or content display.

The input/output interface 124 provides communication to and from the content receiver 104 to and from a variety of devices/sources. For example, the input/output interface 124 may receive data from a remote control, control buttons located on the content receiver 104, other computing devices, and the like. Additionally, the input/output interface 124 may also receive/transmit data to and from an optical disc drive (e.g., digital video disc drive), universal serial bus drive, other video/audio/data signals (e.g., signals from a video game console), and the like. The input/output interface 124 may also provide an output signal 126 to the display device 102. The output signal 126 may be substantially similar to the broadcast signal 116 but may include additional information, such as a matrix barcode, subtitles, and the like.

Figure 3:
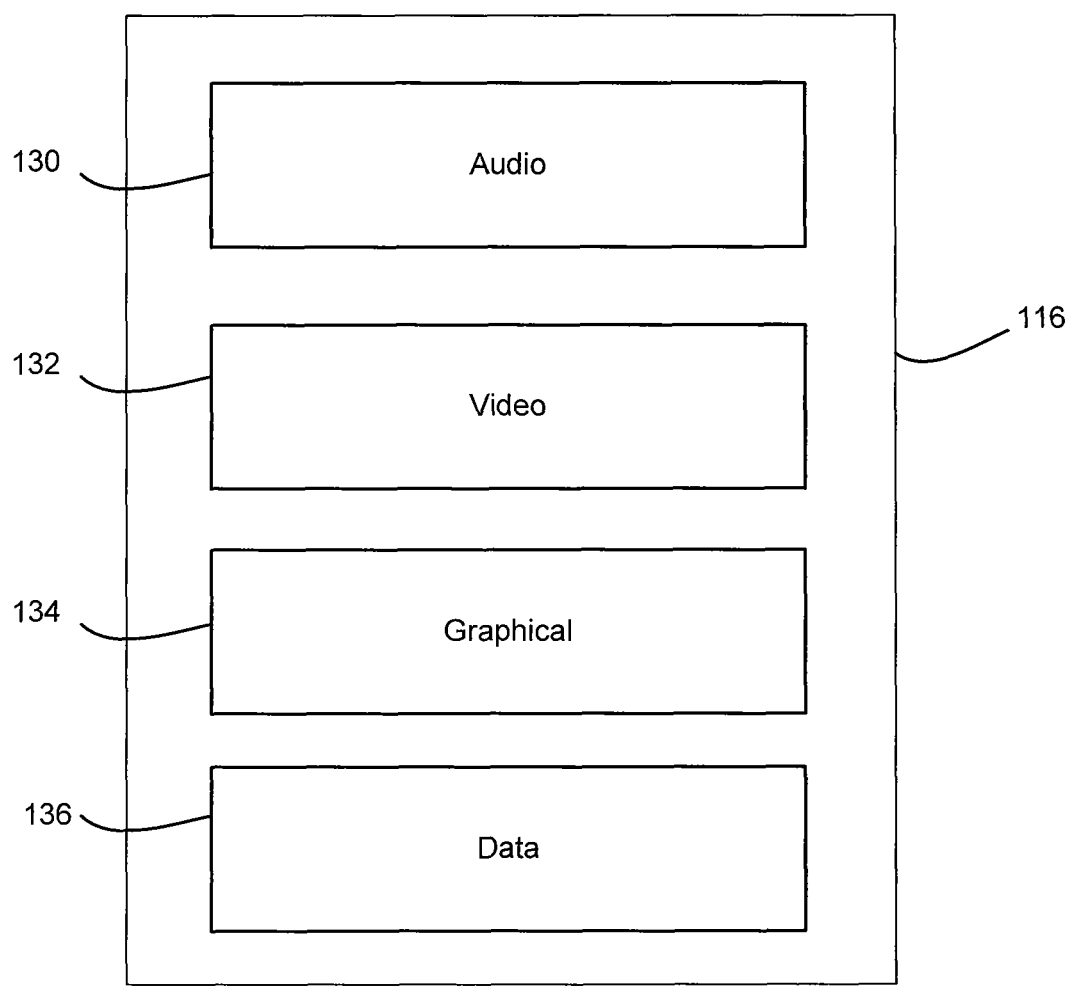
FIG. 3 is a block diagram of a channel transmitted in the broadcast signal, showing the various data steams making up the channel.

FIG. 3 is a block diagram of an embodiment of the broadcast signal 116 for a select channel. Referring now to FIGS. 1-3, the broadcast signal 116 is transmitted from the content provider 114 to the content receiver 104. The broadcast signal 116 may include content such as audio, visual, and data signals and other data associated with a video broadcast stream.

The broadcast signal 116 may also include multiple packet identifiers (PIDs) that may associate portions or select signals of the broadcast signal 116 with each other. For example, a particular PID may include the audio, visual, graphical and data signals for a select channel, such that each channel will display/output each corresponding signal at the same time. For example, using an input device (e.g., remote) a user may select a particular channel to be displayed. When the user selects a particular channel, the content receiver 104 determines the PIDs associated with the channel and then processes the broadcast signal 116 in order to output the selected signal(s).

As shown in FIG. 3, the particular PIDs for a select channel may include an audio signal 130, a video signal 132, a graphical signal 134 and/or a data signal 136. Also, in some embodiments, the broadcast signal 116 may include multiple graphical signals 134 and/or data signals 136 for a select channel. For example, in some embodiments the broadcast signal 116 for a particular time zone (e.g., mountain standard time) may include a separate graphical signal 134 and/or data signal 136 for each state (e.g., a different graphical signal 134 for content receivers 104 in Colorado, Wyoming, New Mexico, and so on).

The audio signal 130 may be an electronic signal with audio sounds, such as music, speech and the like. The video signal 132 may be an electronic signal with video data, such as images, movies, and other types of visual displays. The graphical signal 134 may include a matrix barcode, and/or electronic data that may be configured to produce a matrix barcode, an image or the like. Additionally, the graphical signal 134 may also include subtitling data, such as subtitles corresponding to a particular channel. The data signal 136 may include data similar to the other signals or may include a separate type of data.

In one embodiment, the graphical signal 134 may include a matrix barcode data and the data signal 136 may include subtitling data. In other embodiments, the graphical signal 134 may include both the matrix barcode 138 and subtitling data. In still other embodiments, the data signal 136 may include information about a particular channel, e.g., information such as the name of the television show/movie currently selected, the time the show is on, a description of the content and the like. In still other embodiments, the data signal 136 may include data corresponding to data to be implemented with a matrix barcode 138 that may within the graphical signal 134 or generated via the content receiver 104.

Also, in some embodiments, either the graphical signal 134 or the data signal 136 may be omitted. For example, either the graphical signal 134 or the data signal 136 may transmit data corresponding to the omitted signal, e.g., the data signal 136 or the graphical signal 134, respectively. In other words, the data signal 136 may transmit the matrix barcode 138 and the graphical signal 134 may be omitted. Similarly, the graphical signal 134 may transmit data to construct the matrix barcode 138 and the data signal 136 may be omitted. As such, the discussion of either signal 134, 136 should not be limited to a particular type of data and the terms graphical and data used to describe each signal 134, 136 is not intended to be limiting.

The graphical signal 134 and/or data signal 136 may be similar to signals used for subtitling data, i.e., they may be customized depending on the language preference of a user and/or the location of a particular content receiver 104. This may be possible because the broadcast signal 116 may include multiple graphical and/or data signals 134, 136 for a particular channel. For example, there may be a graphical signal 134 for Spanish and a graphical signal 134 for English. In these embodiments, the graphical signal 134 (and/or data signal 136) and corresponding data (i.e., matrix barcode 138) may be customized based on the location, preferences, and other factors of the user and/or content receiver 104. For instance, the graphical signal 134 may be sent to a subset of broadcast signal 116 viewers. For example, the graphical signal 134 may be sent as a separate PID, such that the PID may align with PIDs for audio/visual signals on in certain locations. This means that a channel in one location may have a first graphical signal and that same channel in another location may have another graphical signal. These embodiments may allow the matrix barcode 138 (as contained in either or both the graphical signal 134 and the data signal 136) to be sent to multiple content receivers 104, but only displayed on a select set of content receivers 104 (or a single content receiver 1040. For example, the matrix barcode 138 corresponding to a select geographical region (e.g., particular state, county, city) may only be displayed by content receivers 104 in that particular geographical region.

Additionally, the graphical signal 134 and/or data signal 136 may include data, such as metadata, specifying criteria for presenting the matrix barcode 138 and/or other graphical images. For example, the metadata may specify a particular geographic region where a particular matrix barcode 138 should be displayed. In other embodiments, either or both the graphical signal 134 and the data signal 136 may include data that may allow the content receiver 104 to create the matrix barcode 138. For example, in some embodiments content receiver 104 may render the matrix barcode 138 based on information in either or both the graphical signal 134 and/or the data signal 136.

Moreover, multiple matrix barcodes 138 (e.g., matrix barcodes 138 customized based on a particular geographic region, channel, and the like) may be sent to a group or number of content receivers 104. Each specific content receiver 104 may then be able to select which matrix barcode 138 (out of the group) should be displayed, if at all. For example, the graphical signal 134 may include one matrix barcode 138 associated with data in a first language and a second matrix barcode 138 associated with data in a second language. The content receiver 104 may choose the matrix barcode 138 to output to the display device 102 based on the user setting/preference data (stored in storage 122) corresponding to language. Thus, either via the graphical signal 134, the data signal 136 and/a select matrix barcode 138 may be displayed via a select content receiver 104. This may be beneficial, as the matrix barcode 138 may embed certain data corresponding to a geographical location of the content receiver 104 and/or user. Furthermore, these embodiments may allow for multiple matrix barcodes 138 to be sent over a single signal (e.g., the graphical or data signals 134, 146), but only the select matrix barcode 138 may be displayed.

Figure 4:
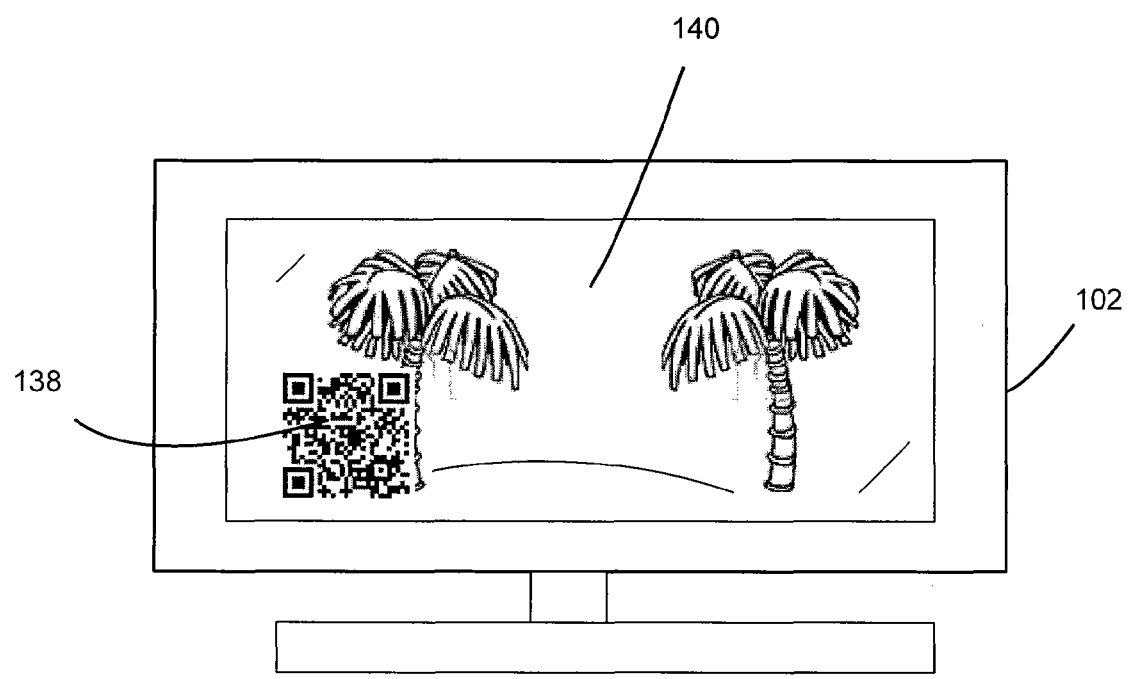
FIG. 4 is a screenshot for an embodiment of an output signal displayed on the display device.

FIG. 4 is a block diagram illustrating the display device 102 displaying a content image 140 with a matrix barcode 138 overlaid on the content image 140. Referring now to FIGS. 2-4, after the content receiver 104 receives the broadcast signal 116, the broadcast signal 116 may be provided and then selectively displayed on the display device 102. For example, a user may select a particular channel to be displayed on the display device 102. The content receiver 104 may then process the broadcast signal 116 via the processor 120 to determine the proper audio signal 130, video signal 132, graphical signal 134 and/or data signal 136 associated with the particular channel. In some instances, a particular channel may have more or fewer signals then the signals illustrated in FIG. 3, e.g., an audio-only channel. In these instances the matrix barcode 138 may be displayed alone, rather than overlaid on top of the content image 140.

The content receiver 104 checks to see if the graphical signal 134 and/or the data signal 136 include any data to be displayed. For example, the graphical signal 134 may include a matrix barcode 138 and/or data instructing the processor 120 when to display the matrix barcode 138. In other implementations, the graphical signal 134 may include the matrix barcode and the data signal 136 may include the information as to when/where the matrix barcode 138 should be displayed. In still other embodiments, the data signal 136 may include data that may allow the content receiver 104 to create a matrix barcode 138 and/or information corresponding to where/when to display the matrix barcode 138.

As shown in FIG. 4, if criteria for displaying the graphical signal 134 are met the matrix barcode 138 (or other image) may be overlaid on top of the video signal 132 image 140, e.g., the specified channel is selected, the specified time is reached, and so on. In this embodiment, the image 140 is displayed and the matrix barcode 138 is displayed on top of a portion (or all) of the image 140. It should be noted that the matrix barcode 138 may vary in size, shape and/or location on the image 140. In other embodiments, the matrix barcode 138 may be displayed on its own (i.e., not overlaid on the image 140). For example, the matrix code 138 may be displayed on an audio only channel or on a channel (or moment in time) without any audio or video signal 130, 132 (i.e., blank screen/sound). These embodiments may be desirable for instances where there may not be an image 140 displayed.

The matrix barcode 138 may be a two-dimensional barcode with data included in both the horizontal and vertical directions. Data that may be included in the matrix barcode 138 may be practically any type of data and/or other information. For example, in one embodiment, the matrix barcode 138 may include numeric, alphanumeric, binary, symbols, and the like. Additionally, the data stored within the matrix barcode 138 (when the matrix barcode 138 is analyzed) may display information corresponding to a store address, coupon, website address, telephone number, and almost any other type of data/information. The matrix barcode 138 may be readable by a barcode scanner, a digital camera, a computing device, smart phone or the like. For example, a smart phone may include a software program configured to scan and/or analyze the matrix barcode 138 to extra data.

While the matrix barcode 138 is displayed over the image 140 (or as the only image) a user may capture the matrix barcode 138 via a camera/computing device. The user may then analyze the matrix barcode 138 to view/decode its data. Further, the user may transmit, store, or in any other manner electronically communicate the matrix barcode 138 to stores, other users, third parties and the like.

In other embodiments, the graphical signal 134 and/or data signal 136 may include data corresponding to select aspects of the matrix barcode 138 and the content receiver 104 may generate the matrix barcode 138. For example, the data signal 136 may include data such as the data to be embedded within the matrix barcode 114 (e.g., coupon code information or the like) and the content receiver 104 (via the processor 120). The generated matrix barcode 138 may then include this information, as well as any individualized information, such as a user's name, language preference or the like that may be stored in the content receiver 104. In these embodiments, the size, shape, and other features of the matrix barcode 138 may be additionally customized depending on the content receiver 104 and/or a user's preferences. Further, the graphical signal 134 and/or data signal 136 may also include data such as the frequency, number of times, and the like that the matrix barcode 138 should be displayed.

Figure 5:
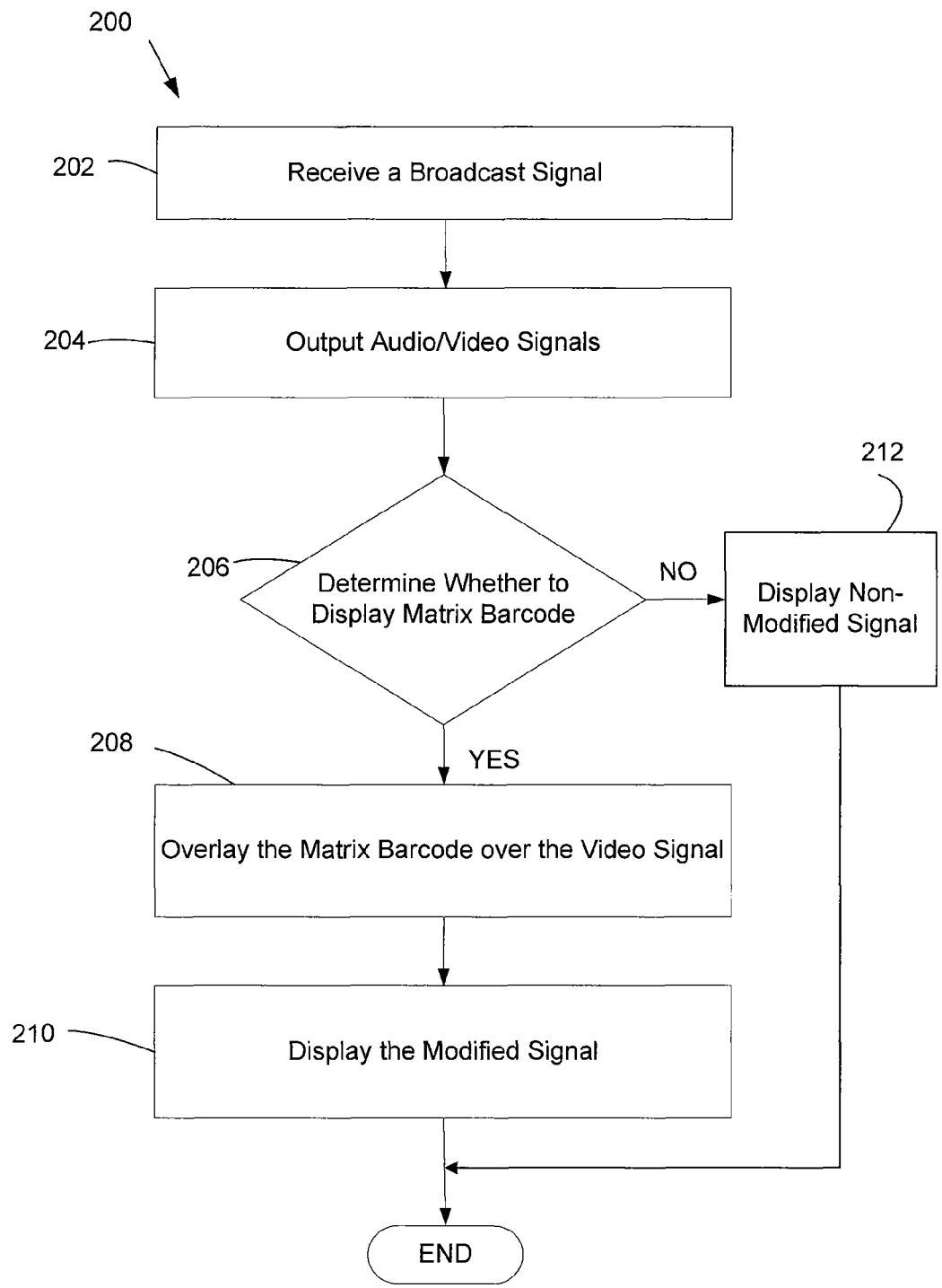
FIG. 5 is a flow diagram of an embodiment for receiving and displaying the broadcast signal of FIG. 4.

FIG. 5 is a block diagram illustrating one method 200 for receiving and displaying a matrix barcode 138 on the display device 102. The method 200 begins with operation 202, in which the content receiver 104 receives the broadcast signal 116. The broadcast signal 116 may be sent from the content provider 114 or any other source of content. Additionally, in operation 202 the broadcast signal 116 may be transmitted wirelessly (e.g., radio waves/frequencies), or via a hard wired connection (e.g., fiber optic cables) or in any other suitable transmission manner. Also, the broadcast signal 116 may be sent directly to a specific content receiver 104, a select group of content receivers 104, and/or multiple numbers of content receivers 104. As discussed above, the broadcast signal 116 may include the audio signal 130, the video signal 132, the graphical signal 134 and/or the data signal 136. Any or all of these signals 130-136 may be common across various content receivers 104 or may be customized to a particular content receiver 104 and/or set of content receivers 104, e.g., have different PIDs for each location and/or subset of users.

In next operation 204, the content receiver 104 outputs the audio signal 130 and/or the video signal 132. In this operation 204 the content receiver 104 may output the audio signal 130 and the visual signal 132 to the display device 102. However, it should be noted that the signals 130, 132 may be output to any other electronic device, for example to a computing device or the like. In embodiments where the signals 130, 132 are output to the display device 102, they may then be displayed/output on the display device 102 and/or speakers.

In the next operation 206, the content receiver 104 (via the processor 120) analyzes the graphical signal 134 and/or data signal 136 to determine if a matrix barcode 138 should be displayed. The content receiver 104 analyzes the signals 134, 136 to determine if at a particular time, on a particular channel, and so on, the matrix barcode 138 should be displayed. For example, a particular content may include a matrix barcode 138 to be displayed at a set time within the content. Therefore, the processor 120 may then analyze if the user is viewing the particular content and then when the content is being displayed at the particular time, the processor 120 may indicate that the matrix barcode 138 should be displayed. Additionally, the processor 120 may also determine if a PID corresponding to a particular graphical and/or data signal 134, 136 corresponds to the geographic location of the content receiver 104.

In this operation 206, the content receiver 104 may analyze the broadcast signal 116 to determine if there is a matrix barcode 138, when it should be output, where it should appear on the display device 102 and/or the frequency in which the matrix barcode 138 should appear. In some instances, there may be no matrix barcode 138 to be displayed or the matrix barcode 138 should be displayed at another time. In this case, the method 200 proceeds to operation 212. In operation 212 the non-modified broadcast signal 116 is output to the display device 102 and displayed. This means that the audio signal 130, visual signal 132 and/or data signal 136 may be displayed. For example, a video and audio content with subtitling may appear on the display device 102.

If in operation 206 the content receiver 104 determines that the matrix barcode 138 should be displayed, then the method 200 proceed to operation 208. The matrix barcode 138 may be displayed either in addition to or instead of the audio signal 130 and/or video signal 132. In operation 208, the content receiver 104 overlays the matrix barcode 138 over the image 140 from the video signal 132. In this case, the total image viewed by a user on the display device 102 is the image 140 with the matrix barcode 138 on top of a portion of the image 140. In other embodiments, the only image that may be displayed on the display device 102 may be matrix barcode 138. For example, there may be only an audio signal and/or neither an audio signal or video signal, in addition to the matrix barcode 138. The content receiver 104 may choose the matrix barcode 138 based on the geographical location, specific channel selected and so on. For example, the data signal 136 may vary depending on the geographical location, or may include data specifying the matrix barcode 138 to display based on the particular location, or the like of the content receiver 104.

As was discussed above, the location, size and length of time that the matrix barcode 138 is displayed may be modified by either the content provider 114 (when creating the broadcast signal 116), by the content receiver 104 and/or the user. Additionally, any other features relating to the appearance, display time/frequency, and the like, of the matrix barcode 138 may be adjusted. Further, after the matrix barcode 138 has been displayed the user may then record the matrix barcode 138 via a computing device and/or camera. Once the user records the matrix barcode 138 it may be scanned and/or analyzed to present/decode or otherwise illustrate data included within the matrix barcode 138.

Figure 6:
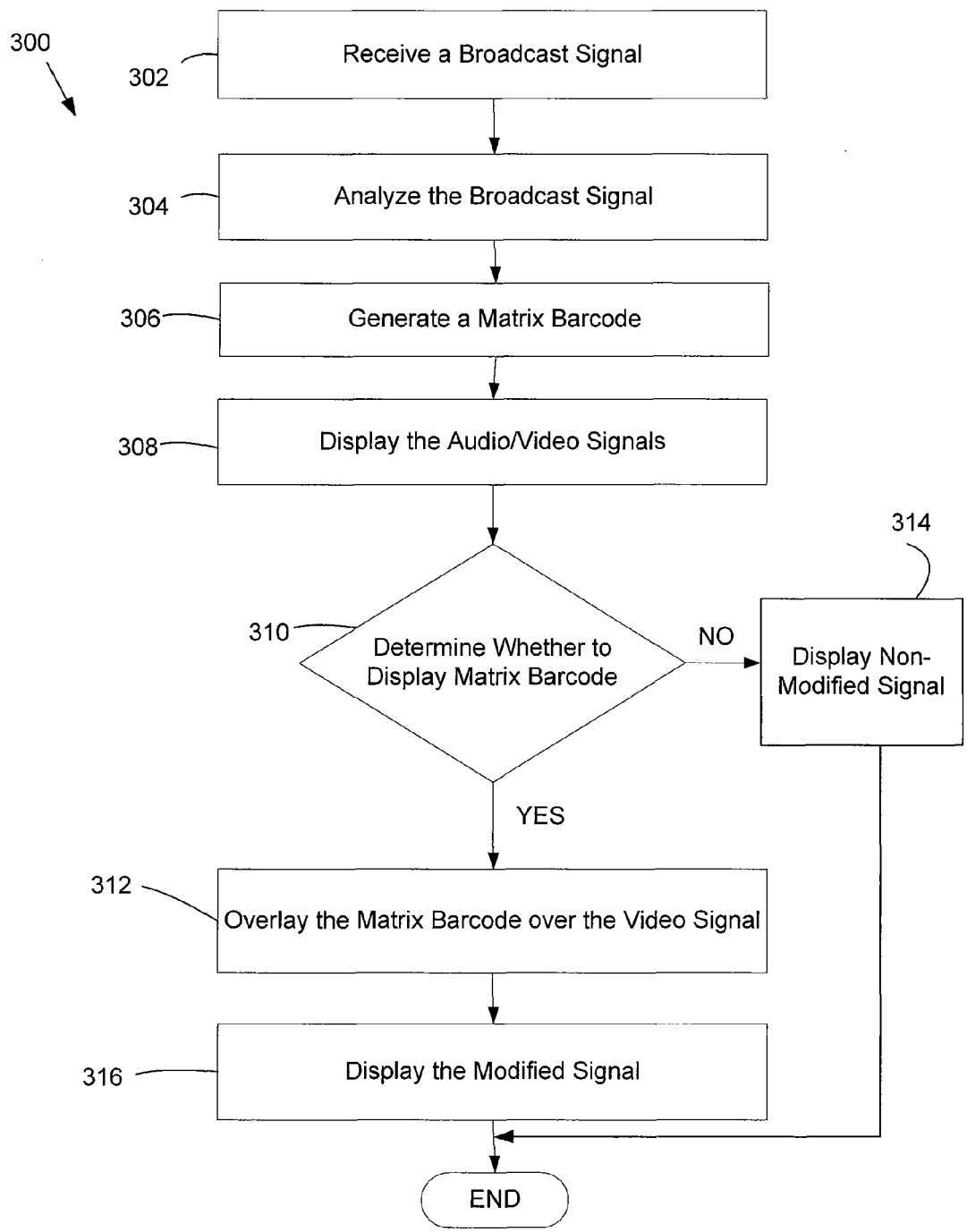
FIG. 6 is a flow diagram of another embodiment for receiving and displaying the content signal of FIG. 4, where the content receiver generates the matrix barcode.

FIG. 6 is a flow chart illustrating a method 300 for receiving and displaying the matrix barcode 138 on a display device 102. In the method 300 of FIG. 6 the content receiver 104 generates the matrix barcode 138, whereas in the method 200 of FIG. 5 the matrix barcode 138 is provided to the content receiver 104. The method 300 begins with operation 302. In this operation 302, the content receiver 104 receives the broadcast signal 116. As discussed above with respect to FIG. 5, the broadcast signal 116 may be transmitted to the content receiver 104 via practically any method. In the next operation 304, the content receiver 104 analyzes the broadcast signal 116. The content receiver 104 analyzes the graphical signal 134 and/or the data signal 136 to determine data associated with the matrix barcode 138.

The method 300 then proceeds to operation 306, and the content receiver 104 generates the matrix barcode 138. The content receiver 104 uses data included in the graphical signal 134 and/or the data signal 136 to generate the matrix barcode 138 including the desired data. For example, the data signal 136 may include data listing a clothing store's address and website. The content receiver 104 may then create a matrix barcode 138 with the clothing store's address and website, and may additionally include information specific to the content receiver 104 (or other data stored in storage 122). For example, the user's name, city and the like may be also included within the matrix barcode 138.

In the next operation 308, the audio signal 130 and/or the video signal 132 are output. In this operation 308, the audio signal 130 and/or the video signal 132 may be output to the display device 102. Then, in operation 310, the content receiver 104 determines whether to display the matrix barcode 138. This operation 310 may be based on data stored in either the graphical signal 134, the data signal 136 and/or the storage 122.

If the content receiver 104 determines that the matrix barcode 130 is to be displayed, the method 300 proceeds to operation 312. The content receiver 104 overlays the matrix barcode 138 on top of the video image 140. In this embodiment, the display may include the image 140 from the video signal 132 as well as the graphical depiction of the matrix barcode 138. In other embodiments, the matrix barcode 138 may be displayed along and/or as the only image, i.e., without the image 140 and/or other graphical image. Once the matrix barcode 138 is displayed, the next operation 316 displays on the display device the generated matrix barcode 138 on top of the video image 140. Once the matrix barcode 138 is displayed the user may record the image via a computing device, camera or the like. The user may then scan/analyze (or present to another person to scan/analyze) the matrix barcode 138 to present/decode the data.

If the content receiver 104 determines that the matrix barcode 130 should not be displayed then operations proceed directly to operation 314, and the broadcast signal 116 is output to the display device 102.

One skilled in the art will understand that the following description has broad application. For example, while embodiments disclosed herein may focus on television broadcast signals, it should be appreciated that the concepts disclosed herein equally apply to other audio/video displays, such as digital video discs, video tapes, and the like. Also, for the sake of discussion, the embodiments disclosed herein may tend to focus on content receivers such as set top boxes; however, these concepts apply to computing devices that may analyze/process electronic signals. Accordingly, the discussion of any embodiment is meant only to be exemplary and is not intended to suggest that the scope of the disclosure, including the claims, is limited to these embodiments.

In methodologies directly or indirectly set forth herein, various operations and operations are described in one possible order of operation but those skilled in the art will recognize the operations and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What we claim is:

1. A method for communicating information to a user, comprising the operations of:
    receiving on a content receiver a broadcast signal comprising a video signal and a graphical signal, wherein the graphical signal comprises a matrix barcode and data instructions configured to instruct a processor of the content receiver of criteria for when to display the matrix barcode;
    determining at the content receiver that the criteria received for when to display the matrix barcode have been satisfied;
    creating a modified signal at the content receiver, wherein the modified signal comprises the video signal with the matrix barcode overlaid on the video signal;
    and providing a user specific content; and updating the matrix barcode to include the user specific content prior to outputting the modified signal;
    outputting the modified signal; and wherein a display location of the matrix barcode on a display device is determined by the user specific content.

2. The method of claim 1, wherein
    the broadcast signal further comprises an audio signal; and
    the graphical signal further comprises subtitling data corresponding to the video signal.

3. The method of claim 1, further comprising selectively displaying on a display device one of the broadcast signal or the modified signal.

4. The method of claim 1, wherein:
    the graphical signal varies based on a location of the content receiver; and
    the video signal does not vary based on the location of the content receiver.

5. The method of claim 1, wherein the operation of determining whether the matrix barcode should be displayed comprises:
    analyzing the broadcast signal to determine if a geographic location of the content receiver corresponds to a geographic datum in the graphical signal; and
    determining if a user preference corresponds to a display datum of the graphical signal.

6. A method for receiving and displaying content, comprising the operations of:
    receiving on a content receiver a data signal and a video signal, wherein the data signal comprises data instructions configured to instruct a processor of the content receiver criteria for when to display a matrix barcode;
    analyzing the data signal at the content receiver to identify criteria for displaying data from the data signal;
    generating a matrix barcode at the content receiver based on the data signal;
    determining at the content receiver that the criteria for displaying data from the data signal has been met;
    creating a modified signal at the content receiver and providing a user specific content; and updating the matrix barcode to include the user specific content prior to outputting the modified signal;
    displaying the video signal on a display device and overlaying the matrix barcode on the displayed video signal; and wherein a display location of the matrix barcode on the display device is determined by user data stored on the content receiver.

7. The method of claim 6, further comprising receiving on the content receiver an audio signal.

8. The method of claim 7, wherein the data signal further comprises subtitling data and the audio signal, the video signal and the data signal correspond to a television channel.

9. The method of claim 6, wherein the matrix barcode comprises a graphical image of
 a first set of data in the horizontal direction; and
 a second set of data in the vertical direction.

10. The method of claim 9, wherein the first set of data and the second set of data correspond to a coupon.

11. The method of claim 9, wherein the matrix barcode further comprises user data.

12. A content receiver comprising: a communication interface configured to receive a broadcast signal, the broadcast signal comprising a video signal and a graphical signal, wherein the graphic signal comprises a matrix barcode, geographic data, and data instructions configured to instruct a processor of the content receiver criteria for when to display the matrix barcode; and
 a processor in communication with the communication interface, wherein the processor is configured to output the video signal;
 process the graphical signal to determine if a matrix barcode should be displayed based on whether a location of the content receiver corresponds to the geographic data;
 create a modified signal at the content receiver;
 and provide a user specific content; and updating the matrix barcode to include the user specific content prior to outputting the modified signal;
 overlay the matrix barcode onto a portion of the video signal in response to a determination to output the matrix barcode; and wherein a display location of the matrix barcode on the display device is determined by user data stored on the content receiver.

13. The content receiver of claim 12, wherein the processor extracts the matrix barcode from the graphical signal.

14. The content receiver of claim 12, wherein the processor generates the matrix barcode based on the graphical signal.

15. The content receiver of claim 14, wherein when generating the matrix barcode the processor utilizes a set of user data.

16. The method of claim 6, wherein the criteria comprises a particular channel that is being viewed by a user.

17. The method of claim 6, wherein the criteria comprises a particular time of day.

\* \* \* \* \*